(12) United States Patent
Tang et al.

(10) Patent No.: US 7,410,629 B2
(45) Date of Patent: Aug. 12, 2008

(54) METHOD OF PREPARATION FOR CARBON NANOTUBE MATERIAL

(75) Inventors: Tao Tang, Changchun (CN); Xuecheng Chen, Changchun (CN); Xiaoyu Meng, Changchun (CN)

(73) Assignee: Changchun Institute of Applied Chemistry Chinese Academy of Science, Jilin Province (CN)

( * ) Notice: Subject to any disclaimer, the term of this patent is extended or adjusted under 35 U.S.C. 154(b) by 545 days.

(21) Appl. No.: 11/004,242

(22) Filed: Dec. 3, 2004

(65) Prior Publication Data

US 2006/0062714 A1    Mar. 23, 2006

(30) Foreign Application Priority Data

Jun. 15, 2004    (CN) ................... 2004 1 0010920

(51) Int. Cl.
*D01F 9/12* (2006.01)
(52) U.S. Cl. .................. 423/447.4; 106/468; 977/842
(58) Field of Classification Search ............. 423/447.1, 423/445 B; 977/840
See application file for complete search history.

(56) References Cited

OTHER PUBLICATIONS

Gournis, et al., Catalytic synthesis of carbon nanotubes on clay minerals, Carbon 2002; 40: 2641-2646.*
Georgakilas, et al., Organic derivatization of single-walled carbon nanotubes by clays and intercalated derivates, Carbon 2004; 42: 865-870.*

* cited by examiner

*Primary Examiner*—Stuart Hendrickson
*Assistant Examiner*—Daniel C. McCracken
(74) *Attorney, Agent, or Firm*—Dickstein Shapiro LLP

(57) ABSTRACT

The present invention provides a method for preparing a carbon nanotube material. In the present invention, a mixture of polyolefin and modified montmorillonite is used as the carbon source. Under the action of a catalyst, a carbon nanotube is synthesized in air. The present invention can address the problem of "white pollution" caused by waste plastics, such as waste polyolefin polymers.

5 Claims, No Drawings

METHOD OF PREPARATION FOR CARBON NANOTUBE MATERIAL

FIELD OF THE TECHNOLOGY

The present invention relates to a kind of method of synthesizing a carbon nanotube material. Specifically, the present invention relates to a method for synthesizing a carbon nanotube material in which polyolefin-montmorillonite composite material is used to synthesize carbon nanotube under the action of a supported catalyst.

BACKGROUND OF THE TECHNOLOGY

It is well known that from the microscopic view a carbon nanotube is formed in the following way: multiple carbon atoms each link with three adjacent carbon atoms to form hexagonal ring nuclei among the carbon atoms. By spreading and bending a plane constituted by cellular, repeated hexagonal nuclei, a circular cylinder is formed. The carbon nanotube is characterized in that its diameter is generally in the range from several angstroms to scores of nanometers while its length/diameter ratio is in the range from several tens to several thousands. Because of their excellent physical and mechanical properties and excellent electric conductive property, carbon nanotubes have been widely used. In recent years, research results concerning the modification of polymers by carbon nanotube have been reported. Carbon nanotubes used in this application do not need to be perfect in structure but should be produced in large quantity. Therefore this will demand a synthesizing technology that can produce carbon nanotubes in large quantity at low cost.

Carbon nanotubes were generally manufactured by electrical arc method, laser evaporation method, electrochemical gas phase deposition method, catalyst synthesis method and plasma synthesis method. In these methods, carbon sources used were those of small organic hydrocarbon molecules such as methane, acetylene, ethylene, carbon monoxide and etc. Organic polymers were scarcely used as the carbon source for manufacture of the carbon nanotubes. In addition, in the manufacturing process, an inert gas was used for protection purpose and the facilities used were relatively complex.

SUMMARY OF THE INVENTION

The objective of the present invention is to provide a method for preparing a carbon nanotube material.

In the present invention, a mixture of polyolefin and modified montmorillonite was used as the carbon source. Under the action of a catalyst, a carbon nanotube was synthesized in air. This method represents a new route for preparing carbon nanotubes. Another more important aspect is that along with the wide applications of polymeric materials in industrial, agricultural and daily like fields, the problem of "white pollution" brought by the waste plastics is causing serious threat to the environment. Among the waste plastics, more than 50% of them are polyolefin polymers. The present invention that uses waste plastics of polyolefin as the carbon source for synthesizing carbon nanotube will provide a novel route for solving the problem of "white pollution".

The objective of the present invention for preparing a carbon nanotube is to overcome the drawbacks of expensive raw material and complex facility used in the existing technology as well as to finally solve the problem of utilization of waste plastics which at present are only used as fillers in the course of waste plastics recycling. For achieving the objective, the present invention discloses a method for synthesizing a carbon nanotube by employing a cheaper polyolefin and its recovered waste materials as the carbon source and under the joint action of catalyst and nanometer effect of modified montmorillonite.

The present invention provides a process for preparing a carbon nanotube material, comprising the steps of:

(a) preparing a modified montmorillonite by an ion exchange reaction comprising the substeps of:
   i) acidifying an alkylamine with equal mole of a concentrated HCl;
   ii) mixing the resulting acidified alkylamine with a montmorillonite dispersion in 1:1.about.2 volume ratio of the acidified alkylamine to the montmorillonite dispersion; and
   iii) precipitating, filtering and pulverizing to obtain a modified montmorillonite;

(b) preparing a catalyst by a hydrogenation reduction method, comprising the substeps of:
   i) mixing an aqueous solution of nickel nitrate and an alumina-silica hybrid in a weight ratio of 35-45 parts of nickel to 55-65 parts of alumina-silica hydrid, wherein the alumina-silica hydrid contains 10 wt % of alumina and has a particle size of 10-30 μm;
   ii) drying and calcining the resulting product; and
   iii) reducing the product with a reducing gas containing hydrogen to produce a nickel-supported catalyst;

(c) preparing a polyolefin mixture of a polyolefin, the modified montmorillonite prepared in step a) and the catalyst prepared in step b) in a mixer in the weight ratio of 75~97.5:0~20:0~5 provided that at least one of the amounts of the modified montmorillonite and the catalyst is not 0;

(d) preparing and purifying a nanotube, comprising the substeps of:
   i) placing the polyolefin mixture obtained in step (c) in a crucible and heating the temperature inside crucible up to 550° C.~650° C., wherein the heating time begins from the burning of the polymer and ends when no flame can be observed and cooling the polyolefin mixture to obtain a mixture of carbon nanotube, nickel catalyst and montmorillonite;
   ii) adding a hydrofluoric acid with a concentration of 20-50% to the mixture, mixing, and separating to obtain a carbon powder; and
   iii) adding a mixture of a concentrated sulfuric acid and a concentrated nitric acid, refluxing, and separating to obtain a purified carbon nanotube.

According to one preferred embodiment, the alkylamine is octadecylamine.

According to another preferred embodiment, the montmorillonite is a micrometer grade montmorillonite.

According to one preferred embodiment, the catalyst is a catalyst containing a micrometer grade alumina-silica hybrid as a support on which nickel particles are loaded.

According to another preferred embodiment, the step (c) further comprising the substeps of: premixing the polyolefin and the modified montmorillonite; feeding the mixture through a main feed port into an extruder where the mixture is melted and mixed to give a parent stock; and feeding the catalyst through the second feed port and further melting and mixing, wherein the temperatures at different sections of the extruder were in the range of 160° C.~200° C. and the screw revolution velocity of the extruder was 200~300 rpm.

According to one further preferred embodiment, the polyolefin is at least one selected from a group consisting of polypropylene, polyethylene, ethylene-propylene copolymer and polystyrene.

PREFERRED EMBODIMENTS OF THE INVENTION

In the present invention, polyolefin, metal supported catalyst and organo-modified montmorillonite are mixed. The mixture is subjected to combustion to prepare a carbon nanotube. The main steps and process conditions involved are as follows:

(a) An modified Montmorillonite is Prepared by an Ion Exchange Reaction.

1 Mole of octadecylamine is acidified by equal mole concentrated HCl in 1000 mL deionized water at 80° C. The solution is added to montmorillonite dispersion at a volume ratio of 1:1-2 and is mechanically stirred for 30 min. The montmorillonite dispersion contains 20 g of montmorillonite every 1500 mL. The precipitate is filtered, washed with 80° C. deionized water, air dried, pulverized and vacuum dried at 60° C. for 24 hr successively to produce a micrometer grade modified montmorillonite.

(b) A Catalyst is Prepared by a Hydrogenation Reduction Method.

An aqueous solution of nickel nitrate and alumina-silica hybrid (in the hybrid, the content of alumina was 10 wt % and the particle size of hybrid was in the range of 10-30 micrometer) were mixed in a weight ratio of 35-45 parts of nickel and 55-65 parts of alumina-silica hybrid. The mixture was stirred at 40° C.-60° C. for 0.5-1 hr. The product thus obtained was dried at 80° C.-100° C. for 8-12 hr, calcined at 350° C.-450° C. for 2-4 hr and then was reduced by argon containing 5% hydrogen as a reducing gas and flowed at a rate of 25 mL/min with a heating rate of 7.5° C./min in a temperature range of 500° C.-900° C. for 3-5 hr. After than, heating was stopped but the flow of hydrogen was continued. After cooled to room temperature, a nickel-supported catalyst where the nickel particles were loaded on an alumina-silica hybrid or micrometer grade.

(c) Preparation of a Mixture of the Polyolefin, the Modified Montmorillonite and the Catalyst.

The polyolefin, the modified montmorillonite and the catalyst were put into a Banbury mixer and were melted and mixed at 160° C.-200° C. and at a revolution speed of 60-100 rpm for 5-10 min to give a polyolefin mixture.

Alternatively, the polyolefin and the modified montmorillonite were premixed at room temperature and the resulting mixture was fed through a main feed port into an extruder to be melted and mixed to give a parent stock. Then the catalyst was fed through the second feed port and the melting and mixing were continued. The temperatures at different sections of the extruder were in the range of 160° C.-200° C. and the screw revolution velocity of the extruder was 200-300 rpm. A polyolefin mixture was thus obtained.

The weight percentage of the ingredients of the mixture were as follows: the polyolefin 75-97.5%, the modified montmorillonite 0-20%, the catalyst 0-5%, provided that the modified montmorillonite and the catalyst cannot both be 0%.

The polyolefin used could be polypropylene, polyethylene, ethylene-propylene copolymer or/and polystyrene.

(d) Preparation and Purification of the Carbon Nanotube

Polyolefin mixture obtained in step (c) was placed in a porcelain crucible with a cover and the temperature inside the crucible was heated to 550° C.-650° C. The heating time began from the burning of the polymer and ended when no flame was observed at the top of the crucible. The crucible was then cooled down to room temperature and a black mixture of the carbon nanotube and the nickel catalyst was obtained.

20%-50% of hydrofluoric acid was added to the black mixture obtained in step (c) and the mixture was stirred for 16-24 hr and separated to give a black carbon powder. To the black powder, 1:1 mixture of a concentrated sulfuric acid and a concentrated nitric acid was added and the mixture was refluxed for 2-4 hr. After separation, a purified carbon nanotube was obtained.

The carbon source used in the present invention was a polyolefin or a recovered polyolefin which is cheap and rich. The supported catalyst and the modified montmorillonite can be prepared in a simple way. The mixing facility employed in the process is an ordinary machine facility widely used in the field. The apparatus for synthesizing a carbon nanotube material is a ceramic crucible or an ordinary crucible. Due to the above-mentioned advantages, the method of preparation for carbon nanotube material of the present invention will have the superiority in cost over other methods as well as in the solving of the problem of recovery and utilization of waste plastics.

EXAMPLE 1

An organo-modified montmorillonite was prepared by an ion exchange reaction comprising the following steps. One mole of octadecylamine was acidified by equal mole of concentrated HCl in 1000 mL deionized water at 80° C. The solution was added to 1500 mL montmorillonite dispersion and was mechanically mixed for 30 min. White precipitate obtained was filtered, washed at 80° C. deionized water for 3 times, air dried, pulverized by a pulverizer and vacuum dried at 60° C. for 24 hr successively.

Alumina-silica hybrid with a particle size of 10 micrometer was used as the support. An aqueous solution of nickel nitrate was mixed with an alumina-silica hybrid in a weight ratio of 40% of nickel to 60% of the alumina-silica hybrid. The mixture was stirred and mixed at 40° C. for 1 hr. The product thus obtained was put in a muffle furnace and dried at 100° C. for 8 hr and then calcined at 400° C. for 3 hr and finally was reduced by argon containing 5% hydrogen as a reducing gas and flowed at a rate of 25 mL/min with a heating rate of 7.5° C./min at the temperature of 500° C. for 5 hr. After that, heating was stopped but the flow of hydrogen was continued. Upon cooling to room temperature, a nickel-supported catalyst was obtained.

90 wt % of polypropylene, 5 wt % of the modified montmorillonite and 5 wt % of the catalyst were put into a Banbury mixer at same time and were melted at 200° C. and mixed at a revolution speed of 100 rpm for 5 min to give a polypropylene mixture.

One gram of the mixture was put into a 15 mL crucible and the cover was then put on. An outer flame of a gas burner was used to heat the bottom part of the crucible. After several seconds, the polymer began to be ignited. At that time, the inner temperature of the crucible was 550° C. After the polymer stopped burning, the crucible was taken down and was put in a cool place to be cooled to room temperature. A black mixture of carbon nanotube, nickel-supported catalyst and montmorillonite was obtained.

20% of hydrofluoric acid was added to the above-mentioned black mixture and the mixture was magnetically stirred for 24 hr. After centrifugal separation, a black carbon powder was obtained. To the black powder, a mixture of a concentrated sulfuric acid and a concentrated nitric acid in a 1:1 volume ratio was added and refluxed for 4 hr. After centrifugal separation, 0.13 g of purified carbon nanotube was obtained.

EXAMPLE 2

An organo-modified montmorillonite was prepared by an ion exchange reaction described as follows. One mole of octadecylamine was acidified by equal mole concentrated HCl in 1000 mL deionized water at 80° C. The solution was then added to 1000 mL montmorillonite dispersion and was mechanically mixed for 30 min. A white precipitate was obtained, filtered, and washed with 80° C. deionized water for 3 times, air dried, pulverized by a pulverizer and vacuum dried at 60° C. for 24 hr successively.

An alumina-silica hybrid with a particle size of 20 micrometer was used as the support. An aqueous solution of nickel nitrate was mixed with the alumina-silica hybrid in the weight ratio of 35% of nickel to 65% of the alumina-silica hybrid. The mixture was stirred and mixed at 50° C. for 0.75 hr. The product thus obtained was put in a muffle furnace and dried at 90° C. for 10 hr and then calcined at 350° C. for 4 hr and finally was reduced by argon containing 5% hydrogen as a reducing gas and flowed at a rate of 25 mL/min with a heating rate of 7.5° C./min and the temperature of 700° C. for 4 hr. After that, heating was stopped but the flow of hydrogen was continued. Upon cooling to room temperature, a nickel-supported catalyst was obtained.

95 wt % of recovered polypropylene, 2.5 wt % of the modified montmorillonite and 2.5 wt % of the catalyst was put into a Banbury mixer at same time and were melted at 200° C. and mixed at a revolution speed of 60 rpm for 10 min to give a polypropylene mixture.

3 grams of the mixture was put into a 15 mL crucible and the cover was then put on. An outer flame of a gas burner was used to heat the bottom part of crucible. After several seconds, the polymer began to be ignited. At that time, the temperature inside the crucible was 600° C. After the polymer stopped burning, the crucible was taken down and was put in a cool place to be cooled to room temperature. A black mixture of the carbon nanotube, the nickel supported catalyst and the montmorillonite was obtained.

A hydrofluoric acid with a concentration of 30% was added to the black mixture and the mixture was magnetically stirred for 24 hr. After centrifugal separation, a black carbon powder was obtained. To the black powder, a mixture of the concentrated sulfuric acid and the concentrated nitric acid in a 1:1 volume ratio was added and refluxed for 2 hr. After centrifugal separation 0.18 g of purified carbon nanotube was obtained.

EXAMPLE 3

An organo-modified montmorillonite was prepared by an ion exchange reaction described as follows. One mole of octadecylamine was acidified by equal mole of concentrated HCl in 1000 mL deionized water at 80° C. The solution was added to 2000 mL of a montmorillonite dispersion and was mechanically mixed for 30 min. A white precipitate was obtained, filtered, and washed with deionized water at 80° C. for 3 times, air dried, pulverized by a pulverizer and vacuum dried at 60° C. for 24 hr successively.

An alumina-silica hybrid with a particle size of 30 micrometer was used as the support. An aqueous solution of nickel nitrate was mixed with the alumina-silica hybrid in the weight ratio of 45% of nickel to 55% of alumina-silica hybrid. The mixture was stirred and mixed at 60° C. for 0.5 hr. The product thus obtained was put in a muffle furnace and dried at 80° C. for 12 hr and then calcined at 450° C. for 2 hr and finally was reduced by argon containing 5% hydrogen as a reducing gas and flowed at a rate of 25 mL/min with a heating rate of 7.5° C./min and at the temperature of 900° C. for 3 hr. After that, the heating was stopped but the flow of hydrogen was continued. Upon cooling to room temperature, a nickel-supported catalyst was obtained.

80 wt % of a recovered polypropylene, 15 wt % of the modified montmorillonite and 5 wt % of the catalyst was put into a Banbury mixer at same time and were melted at 200° C. and mixed at a revolution speed of 80 rpm for 8 min to give a polyolefin mixture.

2 grams of the mixture was put into a 15 mL crucible and the cover was then put on. An outer flame of a gas burner was used to heat the bottom part of the crucible. After several seconds, the polymer began to be ignited. At that time, the temperature inside the crucible was 650° C. After the polymer stopped burning, the crucible was taken down and was put in a cool place to be cooled to room temperature. A black mixture of carbon nanotube, nickel-supported catalyst and montmorillonite was obtained.

Hydrofluoric acid with a concentration of 50% was added to the above-mentioned black mixture and the mixture was magnetically stirred for 16 hr. After centrifugal separation, a black carbon powder was obtained. To the black powder, a mixture of a concentrated sulfuric acid and a concentrated nitric acid in a 1:1 volume ratio was added and refluxed for 3 hr. After centrifugal separation, 0.52 g of purified carbon nanotube was obtained.

EXAMPLE 4

5 wt % of the supported catalyst prepared in example 2, 85 wt % of polystyrene and 10 wt % of the modified montmorillonite prepared in example 1 were put into a Banbury mixer at same time and were melted at 180° C. and mixed at a revolution speed of 80 rpm for 8 min to give a polystyrene mixture.

2 grams of the mixture was put into a 15 mL crucible and the cover was then put on. An outer flame of a gas burner was used to heat the bottom part of the crucible. After several seconds, the polymer began to be ignited. At that time, the temperature inside the crucible was 600° C. After the polymer stopped burning, the crucible was taken down and was put in a cool place to be cooled to room temperature. A black mixture of carbon nanotube, nickel supported catalyst and montmorillonite was obtained.

Hydrofluoric acid with a concentration of 40% was added to the black mixture and the mixture was magnetically stirred for 16 hr. After centrifugal separation, a black carbon powder was obtained. To the black powder, a mixture of a concentrated sulfuric acid and a concentrated nitric acid in a 1:1 volume ratio was added and refluxed for 4 hr. After centrifugal separation, 0.21 g of a purified carbon nanotube was obtained.

EXAMPLE 5

85 wt % of an ethylene-propylene copolymer and 15 wt % of the modified montmorillonite prepared in example 2 were put into a Banbury mixer at same time and were melted at 170° C. and mixed at a revolution speed of 70 rpm for 8 min to give an ethylene-propylene copolymer mixture.

2 grams of the mixture was put into a 15 mL crucible and the cover was then put on. An outer flame of a gas burner was used to heat the bottom part of crucible. After several seconds, the polymer began to be ignited. At that time, the temperature inside the crucible was about 600° C. After the polymer stopped burning, the crucible was taken down and was put in a cool place to be cooled to room temperature. A black mixture of carbon nanotube, nickel supported catalyst and montmorillonite was obtained.

Hydrofluoric acid with a concentration of 20% was added to the black mixture and the mixture was magnetically stirred for 24 hr. After centrifugal separation, a black carbon powder was obtained. To the black powder, a mixture of a concentrated sulfuric acid and a concentrated nitric acid in a 1:1 volume ratio was added and refluxed for 3 hr. After centrifugal separation, 0.08 g of a purified carbon nanotube was obtained.

EXAMPLE 6

5 wt % of the supported catalyst prepared in example 2, 75 wt % of polyethylene and 20 wt % of modified montmorillonite prepared in example 3 were put into a Banbury mixer at same time and were melted at 160° C. and mixed at revolution speed of 80 rpm for 8 min to give polyethylene mixture.

2 grams of the mixture was put into a 15 mL crucible and the cover was then put on. An outer flame of a gas burner was used to heat the bottom part of crucible. After several seconds, polymer began to be ignited. At that time, the temperature inside the crucible was about 650° C. After the polymer stopped burning, the crucible was taken down and was put in a cool place to cool it to room temperature. A black mixture of carbon nanotube, nickel supported catalyst and montmorillonite was obtained.

Hydrofluoric acid with a concentration of 30% was added to the black mixture and the mixture was magnetically stirred for 20 hr. After centrifugal separation, a black carbon powder was obtained. To the black powder, a mixture of a concentrated sulfuric acid and a concentrated nitric acid in 1:1 volume ratio was added and refluxed for 3 hr. After centrifugal separation, 0.31 g of a purified carbon nanotube was obtained.

EXAMPLE 7

10 wt % of the modified montmorillonite prepared in example 3, 5 wt % of the supported catalyst prepared in example 2 and 85 wt % of polyethylene were fed into a twin screw extruder to carry out two steps fusion mixing with a revolution speed of a screw at 200 rpm and temperatures of 4 sections at 160° C., 170° C., 170° C. and 170° C. respectively. A mixture of polyethylene and the modified montmorillonite was first added to the 1st feed port of the twin-screw extruder and then the supported catalyst was added to the 2nd feed port of the twin-screw extruder.

1 gram of the mixture was put into a 15 mL crucible and the cover was then put on. An outer flame of a gas burner was used to heat the bottom part of the crucible. After several seconds, the polymer began to be ignited. At that time, the temperature inside the crucible was about 600° C. After the polymer stopped burning, the crucible was taken down and was put in a cool place to be cooled to room temperature. A black mixture of carbon nanotube, nickel supported catalyst and montmorillonite was obtained.

Hydrofluoric acid with a concentration of 20% was added to the black mixture and the mixture was magnetically stirred for 24 hr. After centrifugal separation, a black carbon powder was obtained. To the black powder, a mixture of concentrated sulfuric acid and concentrate nitric acid in 1:1 volume ratio was added and refluxed for 2 hr. After centrifugal separation, 0.090 g of a purified carbon nanotube was obtained.

EXAMPLE 8

10 wt % of the modified montmorillonite prepared in example 1, 5 wt % of the supported catalyst prepared in example 1 and 85 wt % of polyethylene were fed into a twin screw extruder to carry out two steps fusion mixing with a revolution speed of screw at 300 rpm and temperatures of 4 sections at 180° C., 190° C., 200° C. and 200° C. respectively. A mixture of polyethylene and the modified montmorillonite was first added to the 1st feed port of the twin-screw extruder and then the supported catalyst was added to the 2nd feed port of the twin screw extruder.

1 gram of the mixture was put into a 15 mL crucible and the cover was then put on. An outer flame of a gas burner was used to heat the bottom part of the crucible. After several seconds, the polymer began to be ignited. At that time, the temperature inside the crucible was about 650° C. After the polymer stopped burning, the crucible was taken down and was put in a cool place to be cooled to room temperature. A black mixture of carbon nanotube, nickel supported catalyst and montmorillonite was obtained.

Hydrofluoric acid with a concentration of 30% was added to the black mixture and the mixture was magnetically stirred for 20 hr. After centrifugal separation, a black carbon powder was obtained. To the black powder, a mixture of a concentrated sulfuric acid and a concentrated nitric acid in 1:1 volume ratio was added and refluxed for 3 hr. After centrifugal separation, 0.42 g of purified carbon nanotube was obtained.

EXAMPLE 9

10 wt % of modified montmorillonite prepared in example 2, 5 wt % of supported catalyst prepared in example 3 and 85 wt % of polypropylene were fed into a twin screw extruder to carry out two steps fusion mixing with a revolution speed of screw at 250 rpm and temperatures of 4 sections at 180° C., 190° C., 200° C. and 200° C. respectively. A mixture of polypropylene and the modified montmorillonite was first added to the 1st feed port of the twin-screw extruder and then the supported catalyst was added to the 2nd feed port of the twin screw extruder.

1 gram of the mixture was put into a 15 mL crucible and the cover was then put on. An outer flame of a gas burner was used to heat the bottom part of the crucible. After several seconds, the polymer began to be ignited. At that time, the temperature inside the crucible was about 650° C. After the polymer stopped burning, the crucible was taken down and was put in a cool place to be cooled to room temperature. A black mixture of carbon nanotube, nickel supported catalyst and montmorillonite was obtained.

Hydrofluoric acid with a concentration of 40% was added to the black mixture and the mixture was magnetically stirred for 16 hr. After centrifugal separation, a black carbon powder was obtained. To the black powder, a mixture of concentrated sulfuric acid and a concentrated nitric acid in 1:1 volume ratio was added and refluxed for 4 hr. After centrifugal separation, 0.34 g of a purified carbon nanotube was obtained.

We claim:

1. A method for preparing a carbon nanotube material, comprising the steps of:
   (a) preparing a modified montmorillonite by an ion exchange reaction comprising the substeps of:
      i) acidifying an alkylamine with equal mole of a concentrated HCl;

ii) mixing the resulting acidified alkylamine with a montmorillonite dispersion in 1:1~2 volume ratio of the acidified alkylamine to the montmorillonite dispersion; and iii) precipitating, filtering and pulverizing to obtain a modified montmorillonite;

(b) preparing a catalyst by a hydrogenation reduction method, comprising the substeps of:

i) mixing an aqueous solution of nickel nitrate and an alumina-silica hybrid in a weight ratio of 35-45 parts of nickel to 55-65 parts of alumina-silica hydrid, wherein the alumina-silica hybrid contains 10 wt % of alumina and has a particle size of 10-30 μm;

ii) drying and calcining the resulting product; and iii) reducing the product with a reducing gas containing hydrogen to produce a nickel-supported catalyst;

(c) preparing a polyolefin mixture of a polyolefin, the modified montmorillonite prepared in step a) and the catalyst prepared in step b) in a mixer in the weight ratio of 75~97.5:0~20:0~5 provided that the amounts of the modified montmorillonite and the catalyst are not both 0;

(d) preparing and purifying a nanotube, comprising the substeps of:

i) placing the polyolefin mixture obtained in step (c) in a crucible and heating the temperature inside crucible up to 550° C.~650° C., wherein the heating time begins from the burning of the polymer and ends when no flame can be observed and cooling the polyolefin mixture to obtain a mixture of carbon nanotube, nickel catalyst and montmorillonite;

ii) adding a hydrofluoric acid with a concentration of 20-50% to the mixture, mixing, and separating to obtain a carbon powder; and iii) adding a mixture of a concentrated sulfuric acid and a concentrated nitric acid, refluxing, and separating to obtain a purified carbon nanotube.

2. The process acoording to claim 1, wherein the montmorillonite is a micrometer grade montmorillonite.

3. The process according to claim 1, wherein the catalyst is a catalyst containing a micrometer grade alumina-silica hybrid as a support on which nickel particles are loaded.

4. The process according to claim 1, wherein the step (c) further comprising the substeps of: premixing the polyolefin and the modified montmorillonite; feeding the mixture through a main feed port into an extruder where the mixture is melted and mixed to give a parent stock; and feeding the catalyst through the second feed port and further melting and mixing, wherein the temperatures at different sections of the extruder were in the range of 160°~200° C. and the screw revolution velocity of the extruder was 200~300 rpm.

5. The process according to claim 1, wherein the polyolefin is at least one selected from a group consisting of polypropylene, polyethylene, ethylene-propylene copolymer and polystyrene.

* * * * *